United States Patent
Sakakibara

(10) Patent No.: US 7,812,741 B2
(45) Date of Patent: Oct. 12, 2010

(54) PARKING SUPPORT METHOD AND PARKING SUPPORT APPARATUS

(75) Inventor: Seiji Sakakibara, Nagoya (JP)

(73) Assignee: Aisin AW Co., Ltd., Anjo (JP)

( * ) Notice: Subject to any disclaimer, the term of this patent is extended or adjusted under 35 U.S.C. 154(b) by 407 days.

(21) Appl. No.: 11/984,191

(22) Filed: Nov. 14, 2007

(65) Prior Publication Data
US 2008/0122654 A1    May 29, 2008

(30) Foreign Application Priority Data
Nov. 28, 2006    (JP) .............................. 2006-320765

(51) Int. Cl.
*G08G 1/14* (2006.01)
(52) U.S. Cl. .................... 340/932.2; 340/937; 348/148; 701/28
(58) Field of Classification Search ...... 340/932.2–933, 340/937, 903, 435–436; 701/1, 28, 36, 41; 348/113, 118, 148–149; 382/104, 284
See application file for complete search history.

(56) References Cited

U.S. PATENT DOCUMENTS

| | | | |
|---|---|---|---|
| 6,564,130 B2 * | 5/2003 | Shimazaki et al. ............ 701/41 |
| 7,592,928 B2 * | 9/2009 | Chinomi et al. ........... 340/932.2 |
| 2002/0175832 A1 * | 11/2002 | Mizusawa et al. ......... 340/932.2 |
| 2005/0033495 A1 * | 2/2005 | Tanaka et al. ................. 701/36 |

FOREIGN PATENT DOCUMENTS

JP    A 2004-114879    4/2004

* cited by examiner

*Primary Examiner*—Brent Swarthout
(74) *Attorney, Agent, or Firm*—Oliff & Berridge, PLC

(57) ABSTRACT

Parking support systems and methods for use with a vehicle obtain image data from an imaging device provided on the vehicle. The systems and methods output an image on a display on the basis of the image data, generate a predicted course line on the basis of a steering angle of the vehicle on the image, and generate a vehicle width guide line indicating a vehicle width on the image. The systems and methods determine whether the vehicle is in an enter-starting state in which the vehicle is about to enter a parking target area and, when it is determined that the vehicle is in the enter-starting state, extend the vehicle width guide line in a rearward direction of the vehicle.

23 Claims, 14 Drawing Sheets

PARKING SUPPORT METHOD AND PARKING SUPPORT APPARATUS

INCORPORATION BY REFERENCE

The disclosure of Japanese Patent Application No. 2006-320765 filed on Nov. 28, 2006, including the specification, drawings and abstract thereof, is incorporated herein by reference in its entirety.

BACKGROUND

1. Related Technical Fields

Related technical fields include parking support methods and parking support apparatus.

2. Related Art

Parking support apparatus for displaying a photographed image of the rearward of a vehicle on a display are known. Such an apparatus inputs image data through an on-board camera attached at the rear end of the vehicle and outputs a peripheral image on the basis of the image data with a guide line on a display provided in the vicinity of a driver's seat.

For example, Japanese Unexamined Patent Application Publication No. 2004-114879 discloses an apparatus that displays an image of an overhead view around a vehicle. The image is produced on the basis of image data inputted through an on-board camera and at the same time a predicted course based on the current steering angle is superimposed on the overhead view image. In addition, as shown in FIG. 18, it is also suggested that an apparatus display an overhead view image 100 including a predicted locus line 101 based on a current steering angle of a vehicle. A vehicle width guide line 102 extending from the rear end of the vehicle in the traveling direction is also displayed on the image 100.

SUMMARY

However, in the case a steering angle of a vehicle is small, for example, a substantial part of the predicted locus line 101 may be overlapped with the vehicle width guide line 102, or the vehicle width guide line 102 may be drawn on the predicted locus line 101. In such cases, a user who is not familiar with a parking support apparatus may not understand the role of the predicted locus line 101 and the vehicle width guide line 102 intuitively and therefore may not determine which indicator should be used in what situation.

Various exemplary implementations of the broad principles described herein may provide a parking support method and a parking support apparatus capable of displaying a screen that a user can more easily understand.

Various exemplary implementations provide parking support systems and methods for use with a vehicle that may obtain image data from an imaging device provided on the vehicle. The systems and methods may output an image on a display on the basis of the image data, may generate a predicted course line on the basis of a steering angle of the vehicle on the image, and may generate a vehicle width guide line indicating a vehicle width on the image. The systems and methods may determine whether the vehicle is in an enter-starting state in which the vehicle is about to enter a parking target area and, when it is determined that the vehicle is in the enter-starting state, may extend the vehicle width guide line in a rearward direction of the vehicle.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
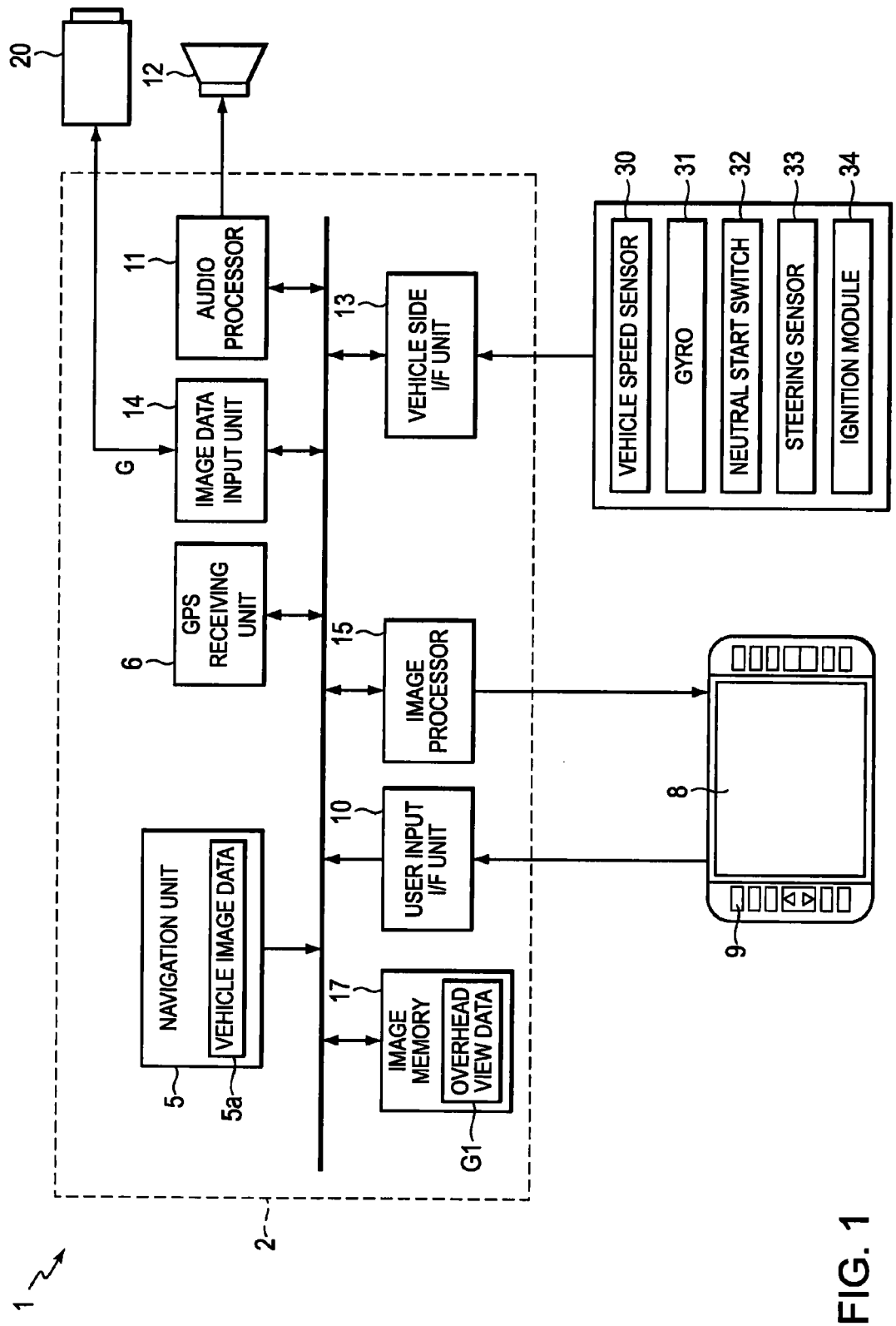
FIG. 1 is a block diagram of an exemplary parking support system.

FIG. 1 is a block diagram illustrating an exemplary structure of a parking support system 1. As shown in FIG. 1, the parking support system 1 may include a controller 2, for example, serving as a parking support apparatus. The controller 2 may include a navigation unit 5 and GPS receiving unit 6. The navigation unit 5 may include CPU, a RAM, a ROM, and so forth (not illustrated) and may store a parking support program. The navigation unit 5 may perform a main control of various processing on the basis of the program. In addition, the navigation unit 5 may input a position detecting signal through the GPS receiving unit 6 and compute an absolute coordinate of a vehicle C that mounts the parking support system 1 (see FIG. 2).

The navigation unit 5 may store vehicle image data 5a. The vehicle image data 5a may be data for outputting an image of the vehicle C onto a display 8. The display 8 may be a pressure-sensitive or electrostatic touch panel to display an operation screen. In addition, when touching the operation screen with a finger, the position being touched may be detected and a signal corresponding to the inputted operation may be outputted to the navigation unit 5 through a user input I/F unit 10. Further, when pressing an operation button 9, located near the display 8, a detecting unit (not illustrated) may output a signal corresponding to the inputted operation to the navigation unit 5.

The controller 2 may include an audio processor 11. The audio processor 11 may include a memory which stores audio data, a D/A converter (each not illustrated), and so forth, may read out the audio data, and may output voice guidance or an alarm sound through a speaker 12 included in the parking support system 1.

The controller 2 may further include a vehicle side I/F unit 13. Through the vehicle side I/F unit 13, the navigation unit 5 may input a vehicle speed pulse from a vehicle speed sensor 30 provided in the vehicle C and count the number of pulses. In addition, the navigation unit 5 may input a direction-detecting signal from gyro 31 through the vehicle side I/F unit 13 and update a current direction stored in the navigation unit 5.

Furthermore, through the vehicle side I/F unit 13, the navigation unit 5 may input a shift position signal from a neutral start switch 32 in the vehicle C and update the shift position as a parameter stored in the navigation unit 5. In addition, the navigation unit 5 may input a steering sensor signal from a steering sensor 33 through the vehicle side I/F unit 13.

When the shift position signal indicating a reverse is inputted from the neutral start switch 32, the navigation unit 5 may set the vehicle C's initial position of moment as a reversing start position. Subsequently, on the basis of the vehicle speed pulse and the steering sensor signal, a relative coordinate and a relative steering angle from the reversing start position may be computed.

The controller 2 may also include an image data input unit 14 for obtaining image data. The image data input unit 14 may operate and control a back-monitoring camera (hereinafter a camera 20) serving as an imaging device provided in the vehicle C and thus successively obtain an image data G.

Figure 2:
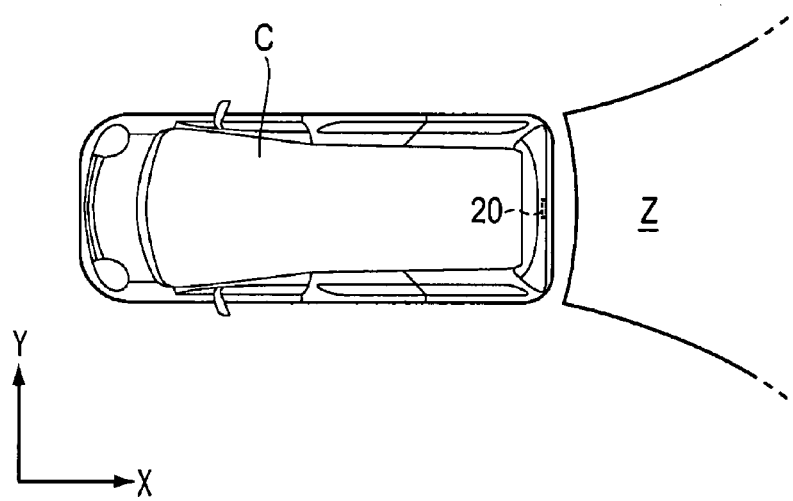
FIG. 2 is a diagram illustrating an exemplary position for installing a camera.

As shown in FIG. 2, the camera 20 may be installed at the rear end of a vehicle, e.g., on a back door of the vehicle C with optical axis directed downward. The camera 20 may be a color digital camera and may have optical mechanisms including a wide-angle lens, a mirror, a CCD image sensor (each not illustrated), and so forth. The camera 20 may pick up an image several meters rearward including the rear end of a vehicle as an image pick-up range Z. The image data input unit 14 may obtain the image data G that has been analog/digital converted by means of the camera 20 and may store it in an image memory 17 temporarily.

Figure 3A:
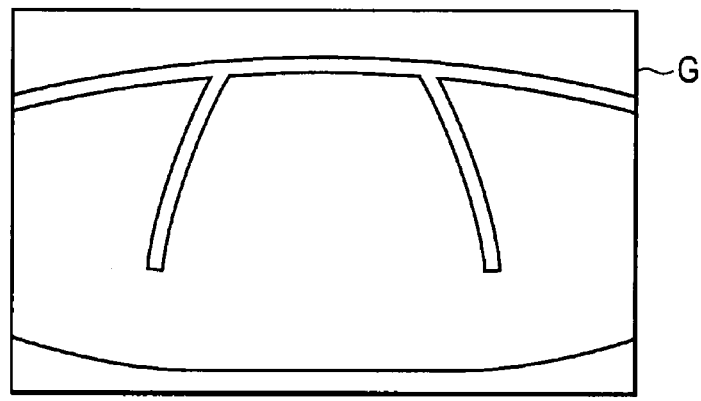
FIG. 3A is a diagram of an exemplary image data.
Figure 3B:
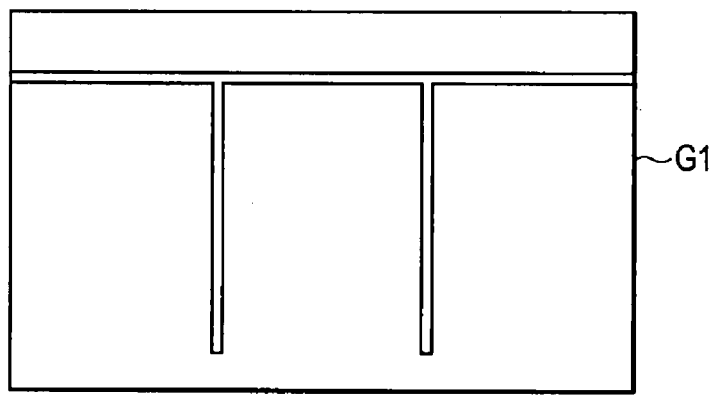
FIG. 3B is a diagram of an exemplary overhead view data.

The controller 2 may also include an image processor 15 that obtains image data, that controls output, that draws vehicle width guide lines, that draws a predicted course, and/or that draws guide line extensions. At each time the vehicle C moves backward for an image recording distance D1 (e.g., about 100 mm) from the reversing start position, the image processor 15 may input the image data G as shown in FIG. 3A through the image data input unit 14. Such input image data G may be distorted due to the lens of the camera 20. Therefore, the image processor 15 may perform a well-known image processing on such image data G and generate overhead view data G1 shown in FIG. 3B. The viewing point of the camera 20 may be located obliquely upward to a road surface; however, the overhead view data G1 may be converted to data viewed from an upper side in a vertical direction to the road surface.

Further, from the navigation unit 5, the image processor 15 may input coordinate data indicating a current relative coordinate on the basis of the reversing start position and steering angle data indicating a current relative steering angle on the basis of the steering angle at the reversing start position. Then the image processor 15 may write the overhead view data G1 into a position based on the coordinate data within a memory area representing a road surface coordinate system of the image memory 17. In the case a steering angle changes relative to immediately after starting the backward movement, the overhead view data G1 may be written by being rotated on the basis of the steering angle data. When writing a new overhead view data G1, if the new overhead view data G1 is overlapped with the overhead view data G1 already written, the overlapped area may be written over with the new overhead view data G1. As described above, writing the overhead view data G1 to the memory area at each time the vehicle C moves backward for the image recording distance D1 enables the successive accumulation of the overhead view data G1.

When equal to or more than predetermined number of the overhead view data G1 is accumulated into the image memory 17, the image processor 15 may read out the overhead view data G1 for a predetermined area from the accumulated overhead view data G1. In addition, the image processor 15 may newly obtain latest image data G (hereinafter current image data G2) that reflects current circumstances around the vehicle from the camera 20. Then, after converting the current image data G2 to an overhead view image, the converted current image data G2 and the overhead view data G1 may be composed and processed, and the generated composite data G3 as the result may be displayed on the display 8.

Figure 4:
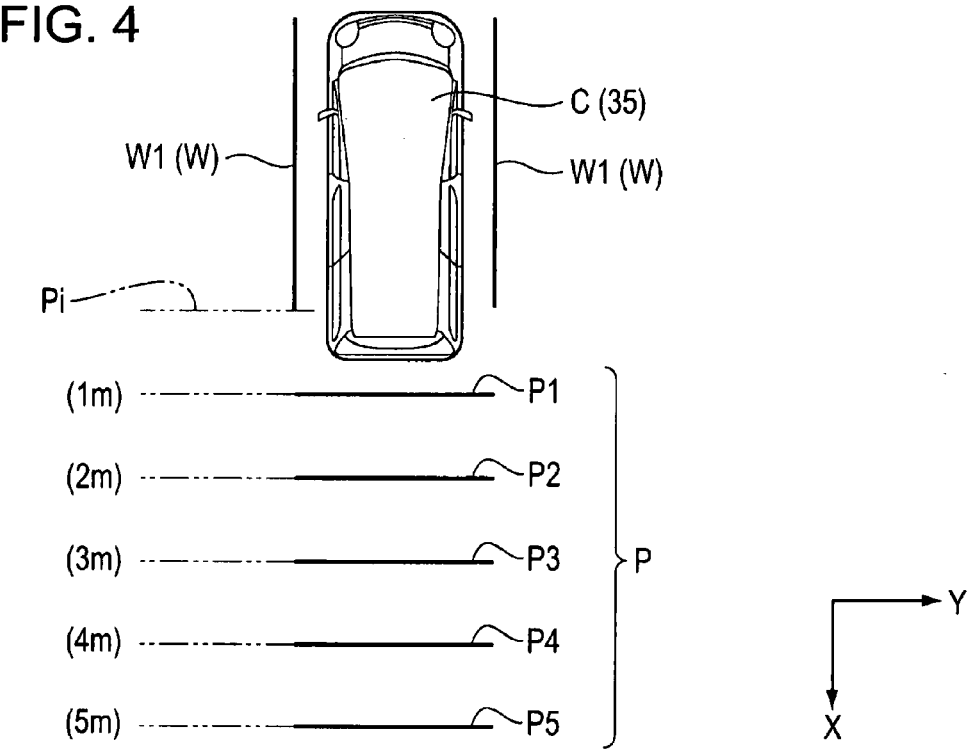
FIG. 4 is a diagram illustrating predicted arrival position indicators.

As shown in FIG. 4, the image processor 15 may draw a vehicle width guide line W for leading the vehicle C to a parking target area and predicted arrival position indicators P as predicted course indicators on an image based on the composite data G3. The predicted arrival position indicators P may be indicators displaying the predicted arrival position of the center of the rear axle from a reversing start position P1 by the meter and may include the first to the fifth predicted arrival position indicator P1, P2, P3, P4, and P5, as shown in FIG. 4.

The first to the fifth predicted arrival position indicators P1, P2, P3, P4, and P5 each may be a vehicle width plus a predetermined clearance width in length in the y-direction of an image coordinate system (x, y) and drawn in a direction (y direction in the figure) nearly orthogonal to the reversing direction (x direction in the figure) of the vehicle C. FIG. 4 shows the first to the fifth predicted arrival position indicators P1, P2, P3, P4, and P5 when a steering is in its neutral position.

Figure 5:
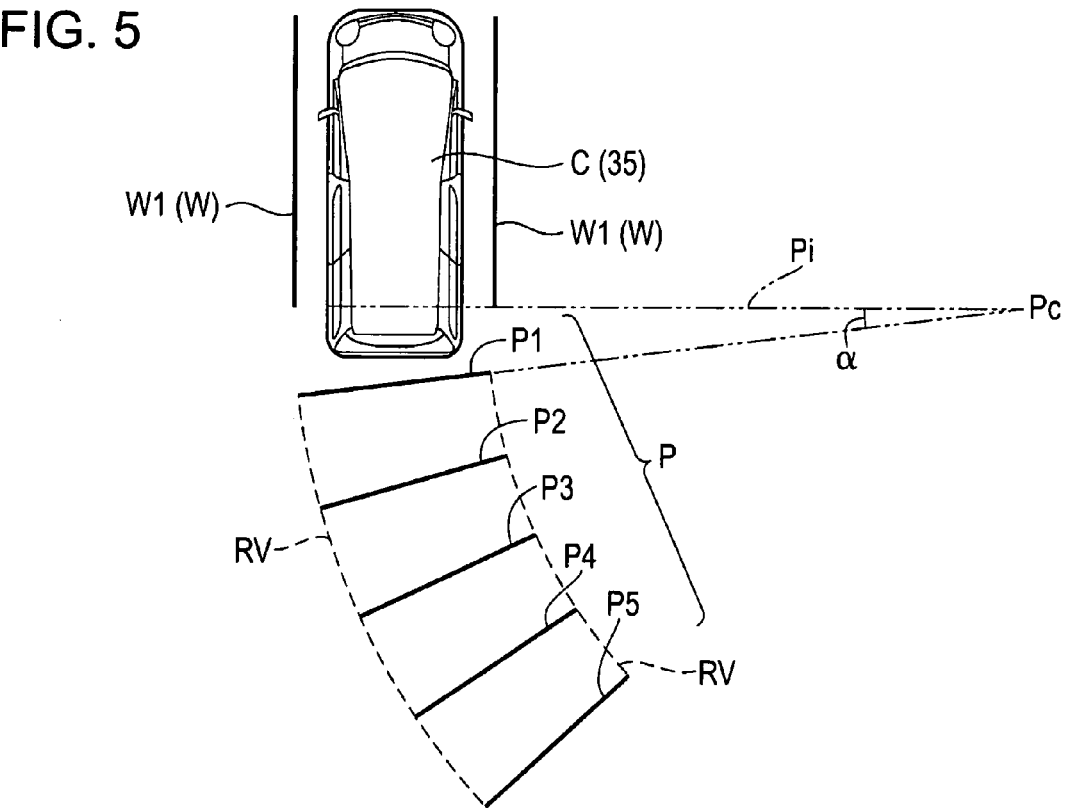
FIG. 5 is a diagram illustrating exemplary predicted arrival position indicators being drawn in a state of making a turn.

As shown in FIG. 5, when the vehicle C is turning, the image processor 15 may draw the first to the fifth predicted arrival position indicators P1, P2, P3, P4, and P5 on the basis of the current steering angle. For example, the image processor 15 may derive a center of the turn Pc on the basis of a steering angle, may compute a pair of predicted locus lines RV, representing the vehicle's predicted course, centering on the center of the turn Pc, may draw the first to the fifth predicted arrival position indicators P1, P2, P3, P4, and P5 in a direction orthogonal to the predicted locus line RV, i.e., in a direction orthogonal to the traveling direction of the vehicle C. As in FIG. 4, the predicted arrival position indicators P may be indicators displaying a predicted arrival position of the center of the rear axle from a reversing start position Pi by the meter. Alternatively, each predicted arrival position indicator P1, P2, P3, P4, and P5 may be drawn on an extended line drawn by a predetermined angle α from the center of the turn Pc based on the reversing start position Pi.

Figure 6:
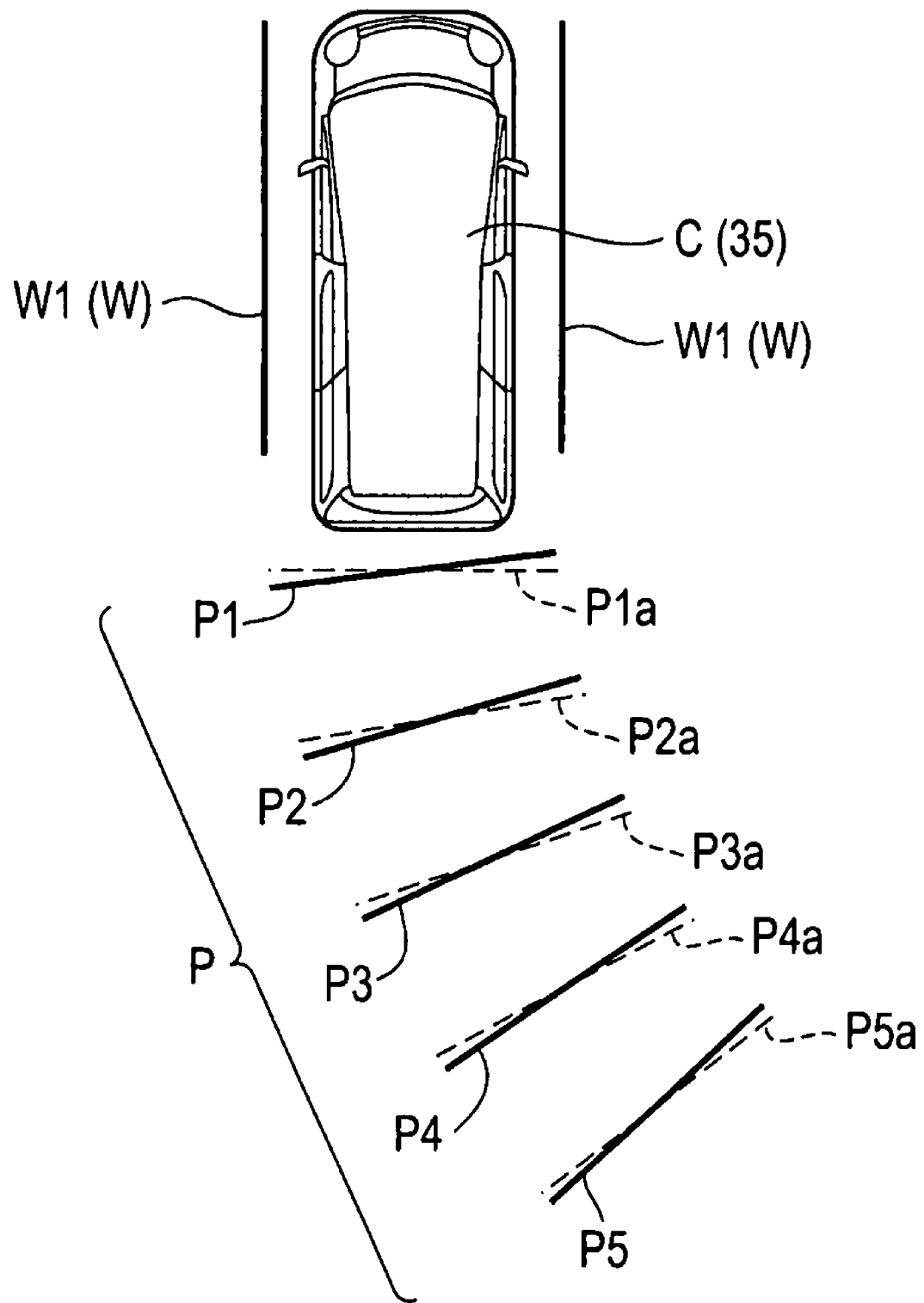
FIG. 6 is a diagram illustrating exemplary predicted arrival position indicators when a steering angle is changed.

Each of these predicted arrival position indicators P1 to P5 may be fixed at a position 1 m, 2 m, 3 m, 4 m, and 5 m away from the reversing start position Pi without moving backward along with the vehicle C that is actually moving backward. That is so say, the vehicle C moving backward may look as if it is coming close to each of the predicted arrival position indicator P1 to P5 fixedly displayed on the road surface on the screen of the display 8. As shown in FIG. 6, when the steering angle changes in mid-course, each of the predicted arrival position indicator P1 to P5 (solid line) whose angle to the vehicle C is changed may be outputted instead of the predicted arrival position indicator P1a to P5a (broken line), for example, and a different locus may be drawn. Each of the predicted arrival position indicators P1a to P5a and each of the predicted arrival position indicators P1 to P5 may not change its relative position from the position of the vehicle but the angle to the vehicle C may only be changed.

In the case that a cumulative reverse distance ΔL of the vehicle C from the reversing start position Pi is smaller than threshold level, the image processor 15 may draw a standard vehicle width guide line W1 shown in FIG. 4 and FIG. 5. In this example, statistics of the reverse distance from where the vehicle C starts to move backward to where it enters a parking target area may be taken, the average of the statistics data may be computed, and the threshold level may be set at 5 m. The standard vehicle width guide line W1 may be drawn from the top of the screen to the rear axle having a predetermined clearance width on both sides of a vehicle image 35 (see FIG. 14) on the basis of the vehicle image data 5a. As described above, while the cumulative reverse distance ΔL of the vehicle C from the reversing start position Pi is shorter than 5 m, e.g., when making a turn before entering the parking target area, the standard vehicle width guide line W1 may be drawn only up to the rear axle of the vehicle image 35. Therefore, the standard vehicle width guide line W1 and each of the predicted arrival position indicators P1 to P5 may not be overlapped. Thus, each of the predicated arrival position indicators P1 to P5 may be easily viewable.

Figure 7A:
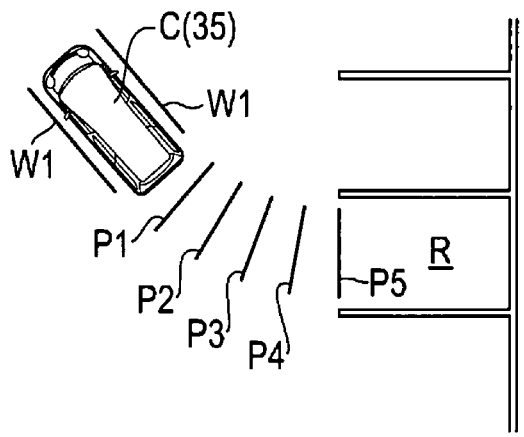
FIG. 7A is a diagram illustrating an example of each indicator along with a backward movement of a vehicle and showing an exemplary predicted arrival position indicator and an exemplary vehicle width guide line when a cumulative arrival distance has reached less than 1 m.

As shown in FIG. 7A, when the vehicle C starts to move backward from the reversing start position Pi, the distance between the rear axle of the vehicle C (the vehicle image 35) and the first predicted arrival position indicator P1 may become shorter than 1 m. The more the vehicle C moves backward, the shorter the relative distance between the rear end of the vehicle and the first predicted arrival position indicator P1 may become. Note that FIG. 7A to FIG. 7F are diagrams illustrating a drawing processing of the predicted arrival position indicators P. The parking target area R is fixed therein; however, an image being viewed from the vehicle side may be displayed in the actual screen (see FIG. 14).

Figure 7B:
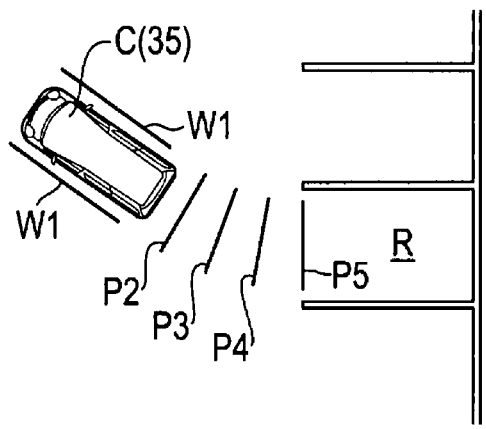
FIG. 7B is a diagram illustrating an example of each indicator along with a backward movement of a vehicle and showing an exemplary predicted arrival position indicator and an exemplary vehicle width guide line when a cumulative arrival distance has reached equal to or greater than 1 m and less than 2 m.

As shown in FIG. 7B, when the rear axle of the vehicle C has reached the position that is 1 m away from the reversing start position Pi in the reversing direction, i.e., a first predicted arrival position indicator P1, the image processor 15 may delete the first predicted arrival position indicator P1 and draw the second to the fifth predicted arrival position indicators P2 to P5.

Figure 7C:
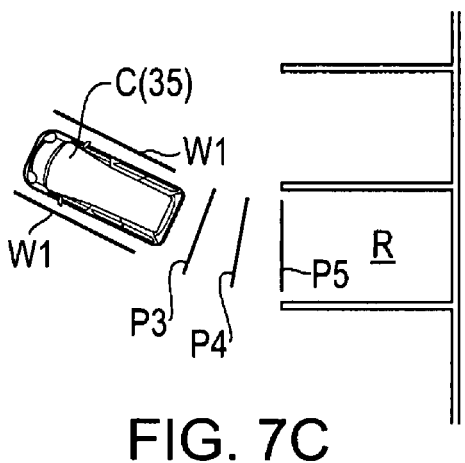
FIG. 7C is a diagram illustrating an example of each indicator along with a backward movement of a vehicle and showing an exemplary predicted arrival position indicator and an exemplary vehicle width guide line when a cumulative arrival distance has reached equal to or greater than 2 m and less than 3 m.
Figure 7D:
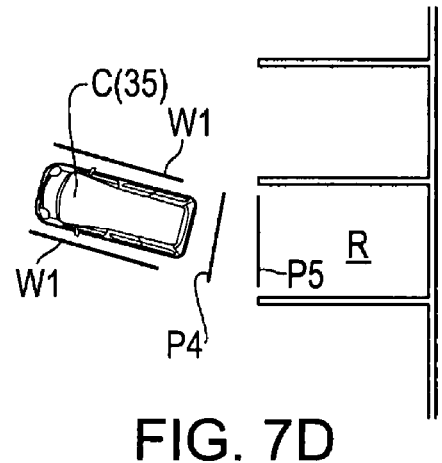
FIG. 7D is a diagram illustrating an example of each indicator along with a backward movement of a vehicle and showing an exemplary predicted arrival position indicator and an exemplary vehicle width guide line when a cumulative arrival distance has reached equal to or greater than 3 m and less than 4 m.
Figure 7E:
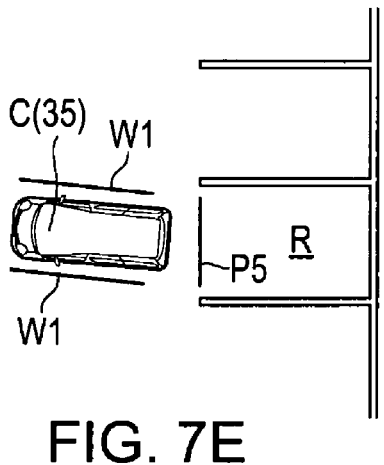
FIG. 7E is a diagram illustrating an example of each indicator along with a backward movement of a vehicle and showing an exemplary predicted arrival position indicator and an exemplary vehicle width guide line when a cumulative arrival distance has reached equal to or greater than 4 m and less than 5 m.

Next, as shown in FIG. 7C, when the position of the rear axle of the vehicle C has reached a second predicted arrival position indicator P2 showing the position that is 2 m away from the reversing start position Pi, the image processor 15 may delete the second predicted arrival position indicator P2. Further, when the position of the rear axle of the vehicle C has reached the position that is 3 m away from the reversing start position Pi, the image processor 15 may delete a third predicted arrival position indicator P3 as shown in FIG. 7D. Furthermore, when the position of the rear axle has reached the position that is 4 m away from the reversing start position Pi, the image processor 15 may delete the fourth predicted arrival position indicator P4 as shown in FIG. 7E. At that time, the cumulative reverse distance ΔL from the reversing start position Pi of the vehicle C is 4 m and has not yet reached 5 m which is threshold level to draw an extended vehicle width guide line W2, therefore, the standard vehicle width guide line W1 may be drawn on both sides of the vehicle C (the vehicle image 35).

Figure 7F:
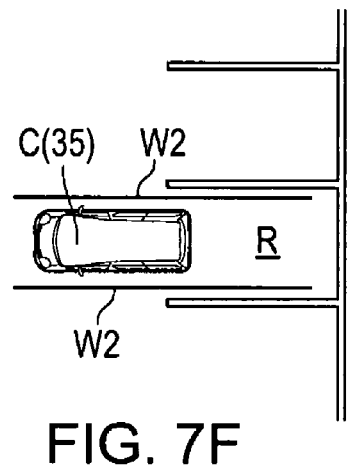
FIG. 7F is a diagram illustrating an example of each indicator along with a backward movement of a vehicle and showing an exemplary predicted arrival position indicator and an exemplary vehicle width guide line when a cumulative arrival distance has reached 5 m.

Further, when the vehicle C has reached the position that is 5 m away from the reversing start position Pi, the image processor 15 may determine that the vehicle C is approaching to the parking target area R and is in the enter-starting state to the parking target area R. Then, the fifth predicted arrival position indicator P5 may be deleted as shown in FIG. 7F. At that time, as the cumulative reverse distance ΔL has reached 5 m, the image processor 15 may extend the standard vehicle width guide line W1 in a rearward direction of the vehicle to draw the extended vehicle width guide line W2. The extended vehicle width guide line W2 may be drawn for the length corresponding to the overall vehicle length from the rear end of the vehicle C.

Next, an exemplary parking support method will be explained with reference to FIG. 8 to FIG. 13. The exemplary method may be implemented, for example, by one or more components of the above-described system 1. However, even though the exemplary structure of the above-described system 1 may be referenced in the description, it should be appreciated that the structure is exemplary and the exemplary method need not be limited by any of the above-described exemplary structure.

Figure 8:
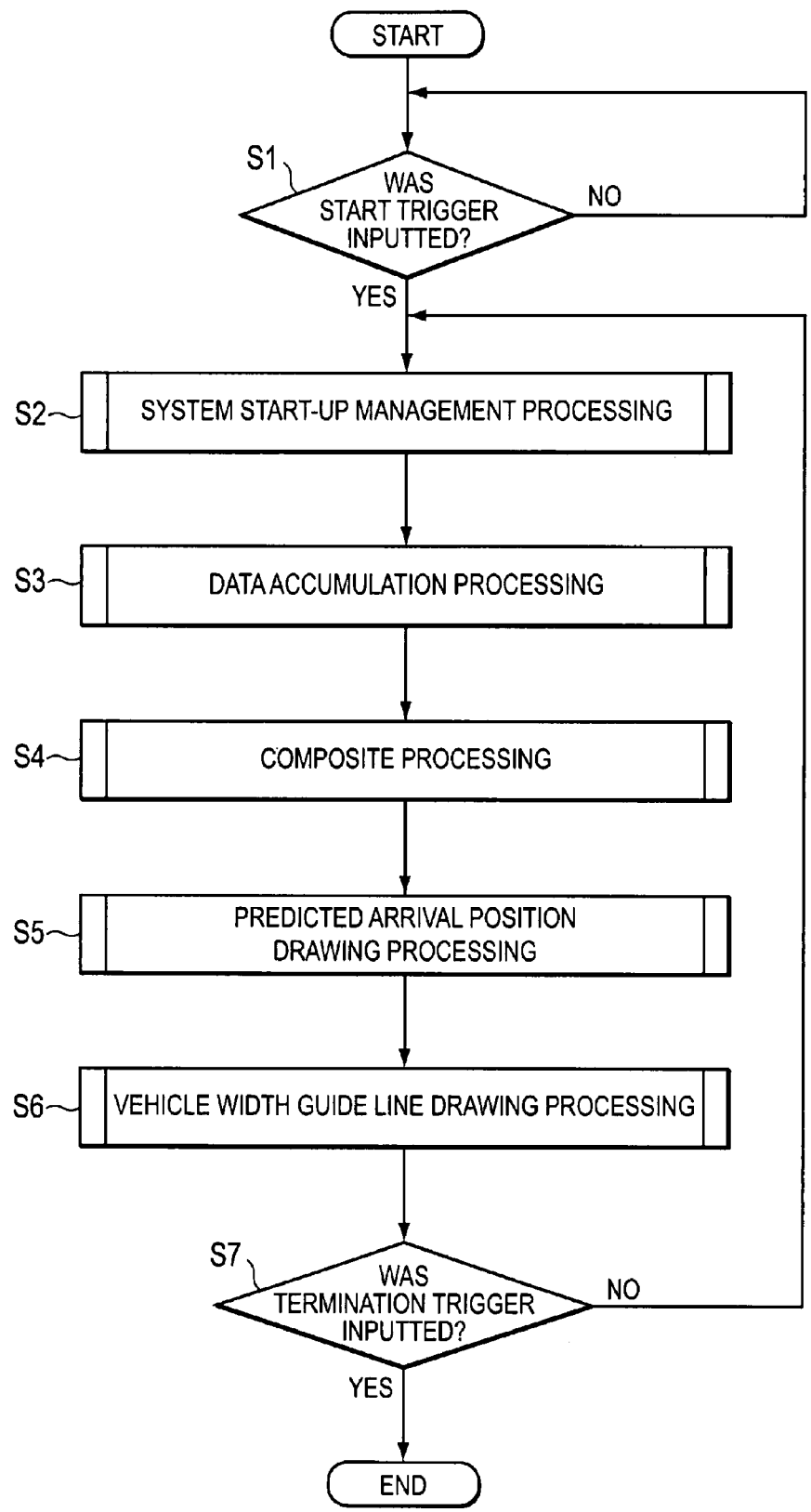
FIG. 8 is a flowchart of an exemplary parking support method.

As shown in FIG. 8, the navigation unit 5 in the parking support system 1 may stand by for an input of a start trigger on the basis of a parking support program (step S1). The start trigger may be an input signal by activating an ignition module 34 (see FIG. 1). When a start trigger is inputted, system start-up management processing (step S2), data accumulation processing (step S3), composite processing (step S4), predicted arrival position drawing processing (step S5), vehicle width guide line drawing processing (step S6) may be performed by controlling the navigation unit 5. Subsequently, the navigation unit 5 may determine whether or not a termination trigger is inputted (step S7). When no termination trigger is inputted (NO in step S7), the procedure may return to step S2. The termination trigger may be an off signal of the ignition module 34 or an input signal of the shutdown of the parking support system 1.

Figure 9:
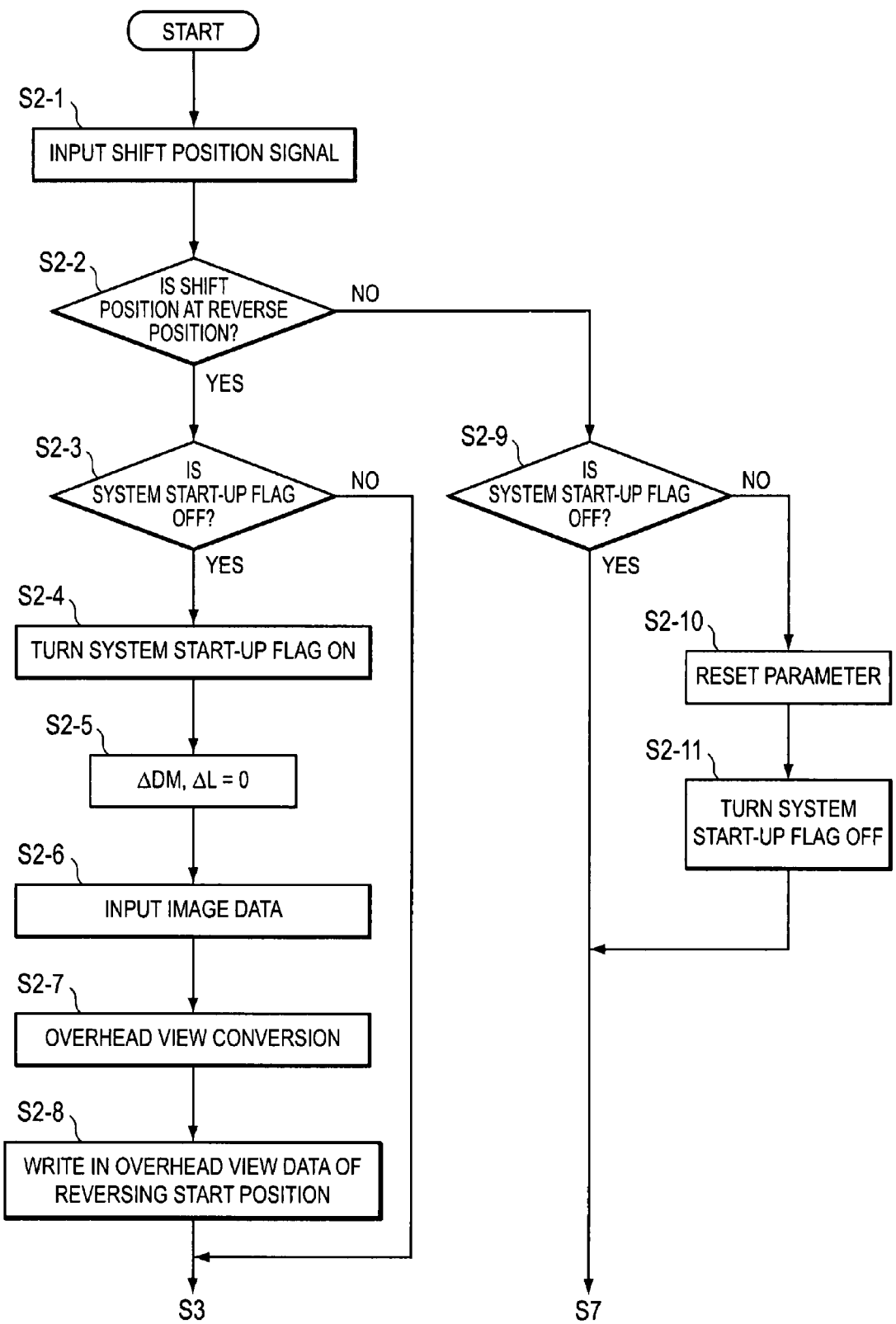
FIG. 9 is a flowchart of an exemplary method of system start-up management.

Next, the system start-up management processing will be explained with reference to FIG. 9. FIG. 9 shows an exemplary start-up management method. In FIG. 9, first, the navigation unit 5 may input a shift position signal through the vehicle side I/F unit 13 (step S2-1). The navigation unit 5 may also determine whether or not the current shift position is at the reverse position on the basis of the shift position signal (step S2-2). When the navigation unit 5 determines that the shift position is at the reverse position (YES in step S2-2), the position of the vehicle C at the time may be set as the reversing start position Pi, and may proceed to step S2-3.

In step S2-3, a system start-up flag stored in the navigation unit 5 may be determined to be off or not. The system start-up flag is a flag indicating whether or not a parking support mode is started. When the navigation unit 5 determines that the system start-up flag is ON (NO in step S2-3), the procedure may proceed to the next data accumulation processing (step S3 in FIG. 10).

Immediately after the shift position turns to the reverse position, the navigation unit 5 may determine that the system start-up flag is OFF (YES in step S2-3). Then, the navigation unit 5 may set the system start-up flag ON (step S2-4), and the image processor 15 may initialize a reverse distance ΔDM stored in the navigation unit 5 and the cumulative reverse distance ΔL to zero (step S2-5). The reverse distance ΔDM may be a parameter for measuring the timing for recording the image data G and may be reset at each time of writing the image data G into the image memory 17. The cumulative reverse distance ΔL may be a parameter for accumulating the distance that the vehicle C moves backward from the reversing start position Pi. When the reverse distance ΔDM and the cumulative reverse distance ΔL are initialized, the image processor 15 may input the image data G from the camera 20 through the image data input unit 14 (step S2-6), may convert the image data G to the overhead view, and may generate the overhead view data G1 (step S2-7).

When the image data G photographed at the reversing start position Pi is converted to an overhead view, the image processor 15 may write the overhead view data G1 to the place corresponding to the reversing start position Pi as an imaging position in the image memory 17 (step S2-8). When the overhead view data G1 is written in the image memory 17, a data number counter, which counts the number of, written overhead view data G1 may be incremented. After writing the overhead view data G1 as described above, the procedure may go to the next data accumulation processing (step S3).

Figure 10:
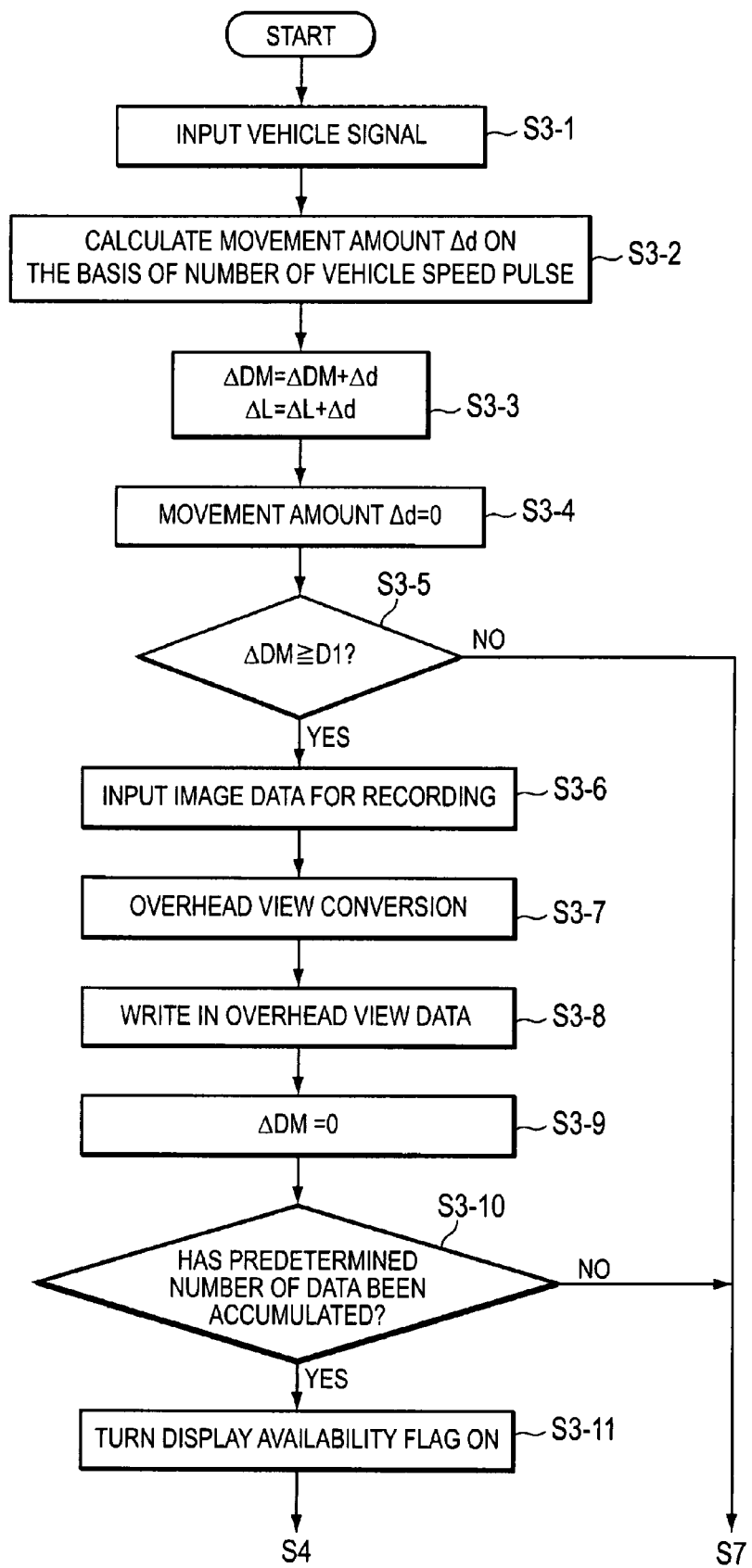
FIG. 10 is a flowchart of an exemplary method of data accumulation.

The data accumulation processing in step S3 may be performed according to the exemplary method shown in FIG. 10. As shown in FIG. 10, the navigation unit 5 may input a vehicle signal (step S3-1). The vehicle signal may include a vehicle speed pulse from the vehicle speed sensor 30 and a steering sensor signal from the steering sensor 33. The navigation unit 5 may input the vehicle speed pulse signal and count the number of pulses. Then, the navigation unit 5 may calculate a movement amount Δd on the basis of the accumulated number of pulses, which have been counted (step S3-2). The movement amount Δd may be a parameter for calculating the reverse distance ΔDM. When the reverse distance ΔDM is updated, the movement amount Δd may be initialized.

Further, the movement amount Δd may be added to the reverse distance ΔDM and the cumulative reverse distance ΔL, which have been initialized in step S2-5, then the reverse distance ΔDM and the cumulative reverse distance ΔL may be updated (step S3-3). When the cumulative reverse distance ΔL is updated, the movement amount Δd is initialized to zero (step S3-4). Thereafter, it may be determined whether or not the reverse distance ΔDM is equal to or greater than the image recording distance D1 (step S3-5). The image recording distance D1 may be set at about 100 mm in the present embodiment.

When the reverse distance ΔDM is determined to be shorter than the image recording distance D1 (about 100 mm) (NO in step S3-5), the procedure may move on to step S7 (see FIG. 8) and determine whether or not there is any termination trigger. If no termination trigger is inputted (NO in step S7), the procedure may go back to the system start-up management processing (step S2).

On the other hand, if the reverse distance ΔDM is determined to be equal to or greater than the image recording distance D1 (100 mm) (YES in step S3-5), the image processor 15 may input image data G again (step S3-6). Then, as in step S2-7, the image data G may be converted to an overhead view (step S3-7) and the generated overhead view data G1 may be written in the image memory 17 (step S3-8). When the overhead view data G1 is written, the above-mentioned data number counter may be incremented. For example, when two sets of overhead view data G1 are written, the counter value of the data number counter may be incremented to two. In addition, the image processor 15 may initialize the reverse distance ΔDM to zero (step S3-9).

Subsequently, the image processor 15 may determine whether or not a predetermined number of the overhead view data G1 has been stored in the image memory 17 on the basis of the data number counter stored in the navigation unit 5 (step S3-10). The predetermined number may be set at, e.g., 10 pieces. For example, in the case that two pieces of overhead view data G1 are written in the image memory 17, the image processor 15 may determine the predetermined number of the overhead view data G6 has not been accumulated (NO in step S3-10), and the procedure may move on to step S7 and determine whether there is any termination trigger. If no termination trigger is inputted, the procedure may go back to step S2.

On the other hand, when the overhead view data G1 is accumulated equal to or more than 10 pieces and the image processor 15 determines that the predetermined number of the overhead view data G1 has been stored in the image memory 17 (YES in step S3-10), a display availability flag stored in the navigation unit 5 may be turned ON (step S3-11) and move on to the next composite processing (step S4). The display availability flag may be a flag that indicates whether composite data G3 using the overhead view data G1 is combinable.

Figure 11:
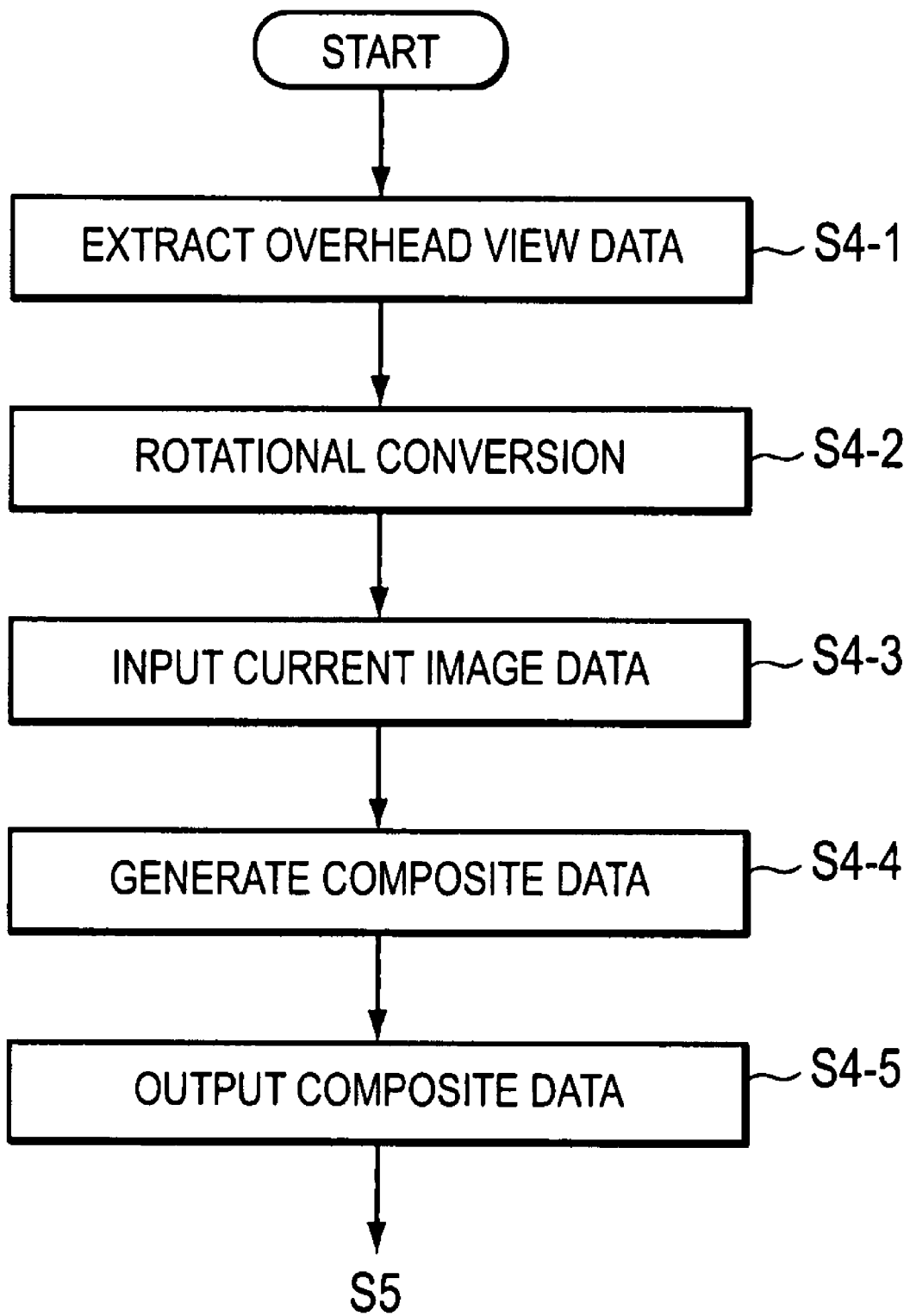
FIG. 11 is a flowchart of an exemplary method of composite processing.

Next, composite processing will be explained with reference to FIG. 11. FIG. 11 shows an exemplary composite processing method. In FIG. 11, first, the image processor 15 may extract a predetermined area based on the current position and the current steering angle of the vehicle C from the memory area in which each of the overhead view data G1 is written (step S4-1). For example, the image processor 15 may extract from the written area the overhead view data G1 for the area corresponding to the current position of the rear part of the vehicle C and the surrounding area in an image coordinate system.

Figure 14:
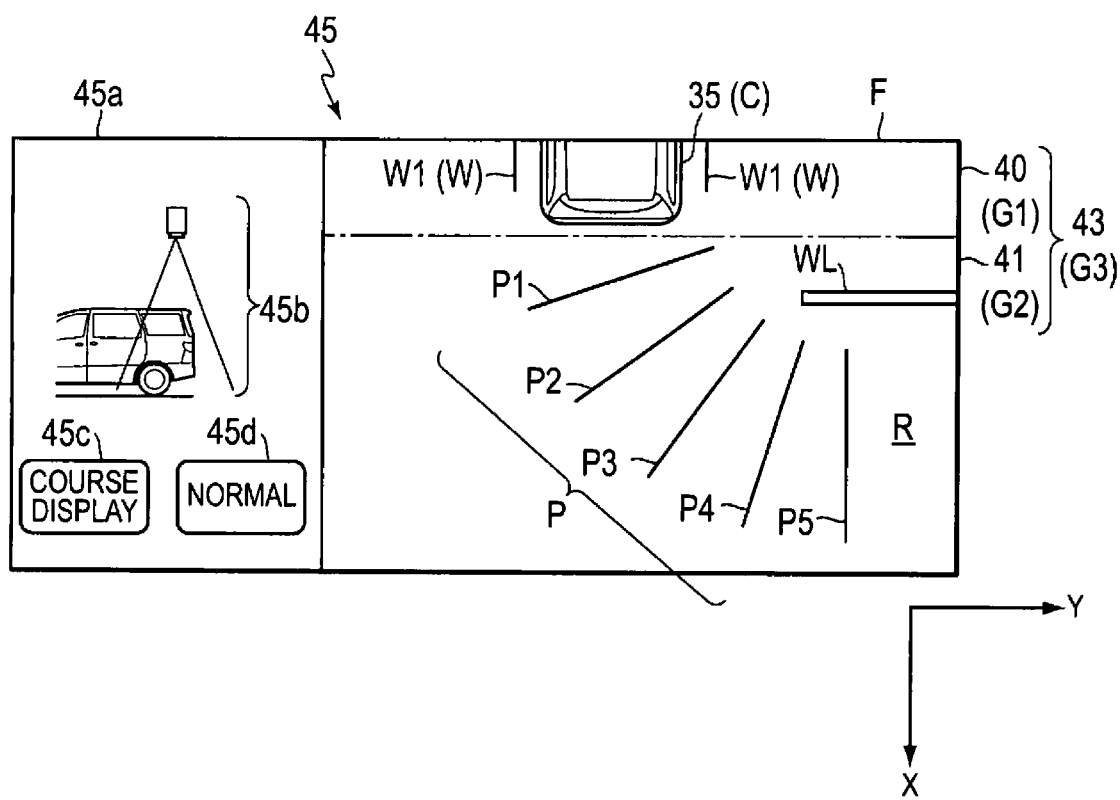
FIG. 14 is a diagram illustrating an exemplary parking support screen at a reversing start position.

When the overhead view data G1 is extracted, the extracted overhead view data G1 may be rotationally converted in accordance with a current steering angle (step S4-2). Further, the image processor 15 may input a latest image data G (the current image data G2) from the camera 20 (step S4-3) and may generate a composite data G3 using the extracted overhead view data G1 and the current image data G2 (step S4-4). More specifically, as shown in FIG. 14, the image processor 15 may dispose the overhead view data G1, which has been rotationally converted on the upper side of a display frame F of the display 8. In addition, the current image data G2 may be converted to an overhead view and the current image data G2 which was converted to an overhead view may be disposed on the lower side of the display frame F to generate the composite data G3.

Then, the image processor 15 may output the composite data G3 (step S4-5). On the upper side of the display frame F, a recorded image 40 based on the overhead view data G1 may be displayed. The recorded image 40 may show an image around the rear part including the blind area from the current position of the camera. On the lower side of the display frame F, a current image 41 based on the current image data G2 may be displayed. A composite image 43 as a peripheral image with the recorded image 40 and the current image 41 may be a consecutive image and may be the overhead view image around the vehicle viewed from an upper side in a vertical direction to the vehicle C.

In addition, the image processor 15 may display the vehicle image 35 based on the vehicle image data 5a at a predetermined position on the composite image 43. Further, on the left side of the display frame F, a guidance image 45a showing the position of the viewing point of the composite image 43 may be displayed. The guidance image 45a may display an image 45b illustrating the position of the vehicle C and the viewing point, a display switching button 45c for switching display/non-display of each of the predicted arrival position indicators P and the vehicle width guide line W, and a mode switching button 45d for switching to a normal mode to display the image data G as it is.

Figure 12:
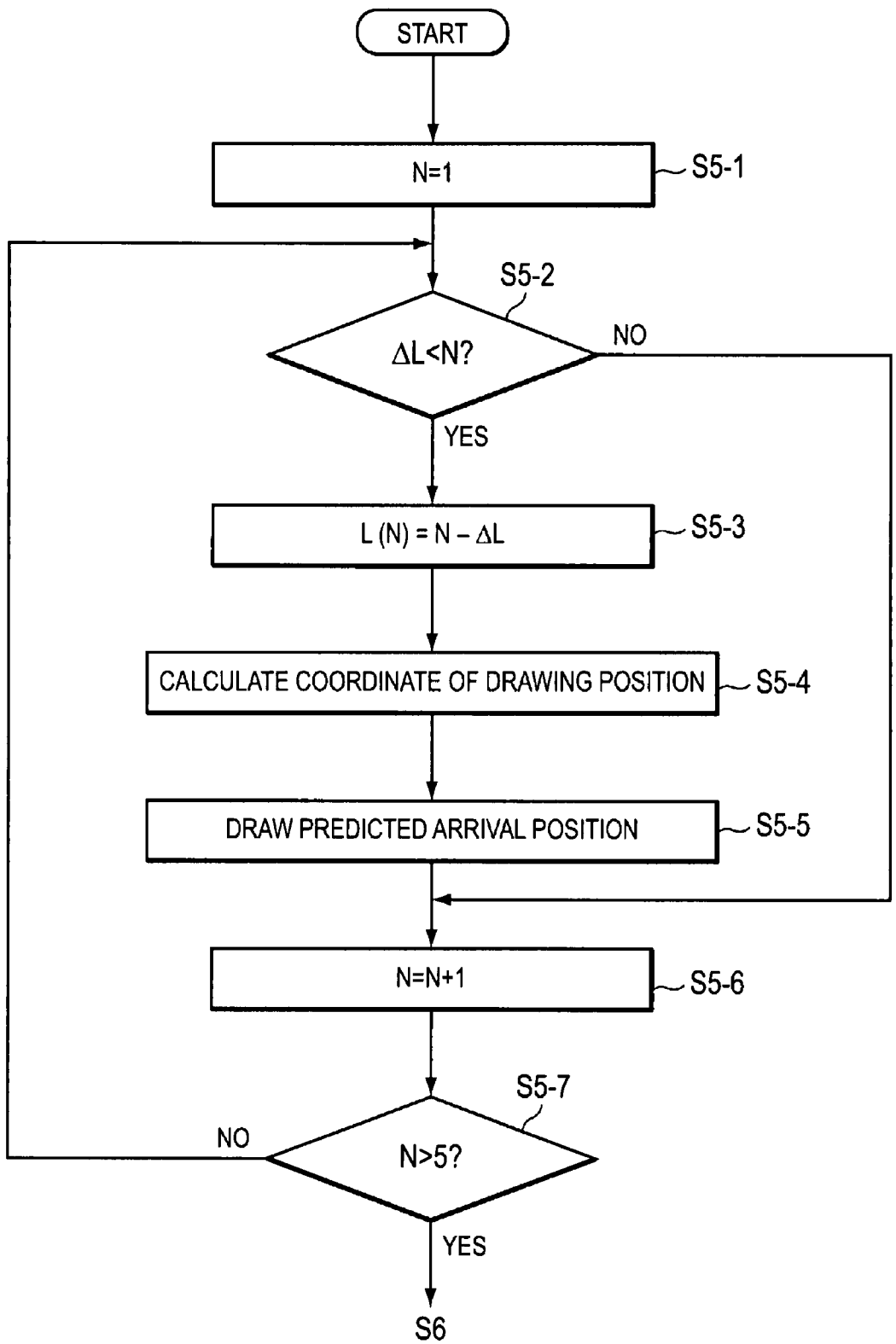
FIG. 12 is a flowchart of an exemplary method of predicted arrival position drawing.

Next, the image processor 15 may perform predicted arrival position drawing processing. Such processing may be performed by the exemplary method of FIG. 12. As shown in FIG. 12, first, the case in which the rear axle of the vehicle C is located at the reversing start position Pi or at the position shorter than 1 m from the reversing start position Pi will be explained. The image processor 15 may set a counter value N of a guide line drawing counter to an initial value "1" (step S5-1). Then it may be determined whether or not a cumulative reverse distance ΔL (m) is shorter than the counter value N (step S5-2). Immediately after starting to move backward, the cumulative reverse distance ΔL is almost 0 m, and the cumulative reverse distance ΔL may be determined to be shorter than the counter value N (N=1 m) accordingly (YES in step S5-2).

Then, a guide line drawing position L (1) indicating the relative distance between the first predicted arrival position indicator P1 and the position of the vehicle may be set at the value which the cumulative reverse distance ΔL is deducted from the counter value N (step S5-3). That is to say, in the case that the vehicle barely moves from the reversing start position Pi, the first predicted arrival position indicator P1 may be drawn not at the position that is 1 m from the center of the rear axle but at the position of cumulative reverse distance ΔL short of the position that is 1 m from the center of the rear axle. In the case that the center of the rear axle locates on the reversing start position Pi, the cumulative reverse distance ΔL is zero and the first predicted arrival position indicator P1 may be drawn at where the guide line drawing position L (1) stores the position that is 1 m from the center of the rear axle accordingly.

When the guide line drawing position L (1) is set, a drawing angle may be calculated on the basis of the guide line drawing position L (1) and the data of the steering angle at that time, and a coordinate of the drawing position of the first predicted arrival position indicator P1 may be calculated (step S5-4). Then, the first predicted arrival position indicator P1 may be drawn on the composite image 43 as shown in FIG. 14 (step S5-5). Subsequently, the counter value N may be incremented and set at "2" (step S5-6) and the counter value N may be determined whether or not it is more than the maximum drawing number "5" for a predicted arrival position (step S5-7). When only the first predicted arrival position indicator P1 is drawn, the counter value N may be "2" in step S5-6 and may be smaller than "5" (NO in step S5-7), therefore, the procedure may return to step S5-2.

In step S5-2, the image processor 15 may compare the cumulative reverse distance ΔL to the counter value N (=2) as described above. Immediately after starting to move backward, the cumulative reverse distance ΔL may be shorter than the counter value N "2 m" (YES in step S5-2), therefore, the guide line drawing position L (2) may be calculated to draw the second predicted arrival position indicator P2 (step S5-3). That is to say, a value that the cumulative reverse distance ΔL is deducted from the counter value N (=2 m) may be inputted at the guide line drawing position L (2). Then, a drawing position of the second predicted arrival position indicator P2 may be calculated on the basis of the guide line drawing position L (2) and the steering angle data (step S5-4), and the second predicted arrival position indicator P2 may be drawn at the drawing position on the composite image 43 (step S5-5). Further, when the counter value N is incremented to be "N=3" (step S5-6), the counter value may be determined smaller than "5" in step S5-7 and the procedure may return to step S5-2.

Thereafter, by repeating the step S5-2 through the step S5-7, a third predicted arrival position indicator P3, a fourth predicted arrival position indicator P4, and a fifth predicted arrival position indicator P5 may be drawn. Then after the fifth predicted arrival position indicator P5 is drawn (step S5-5), when the counter value N is incremented to "6" (step S5-6), the counter value N may be determined bigger than "5" in step S5-7 (YES in step S5-7), and the predicted arrival position drawing processing at a reversing start position Pi or the surrounding of the reversing start position Pi may be terminated.

As a result, as shown in FIG. 14, the five predicted arrival position indicators P1-P5, may be drawn on the composite image 43. In a parking support screen 45, the vehicle image 35 may always be displayed at a predetermined position in the display frame F. In addition, the composite image 43 may be changed into an image of more rearward of the vehicle along with the backward movement of the vehicle C. Further, the drawing position of each of the predicted arrival position indicators P may change on the display frame F along with the backward movement of the vehicle C, but the distance from the reversing start position Pi may not be changed. Therefore, each of the predicted arrival position indicators may look like they are displayed fixedly on the road surface from a driver unless a steering angle is changed. The more the vehicle C moves backward, the more the vehicle image 35 looks like it is approaching each of the predicted arrival position indicators P fixedly displayed on the road surface.

Figure 13:
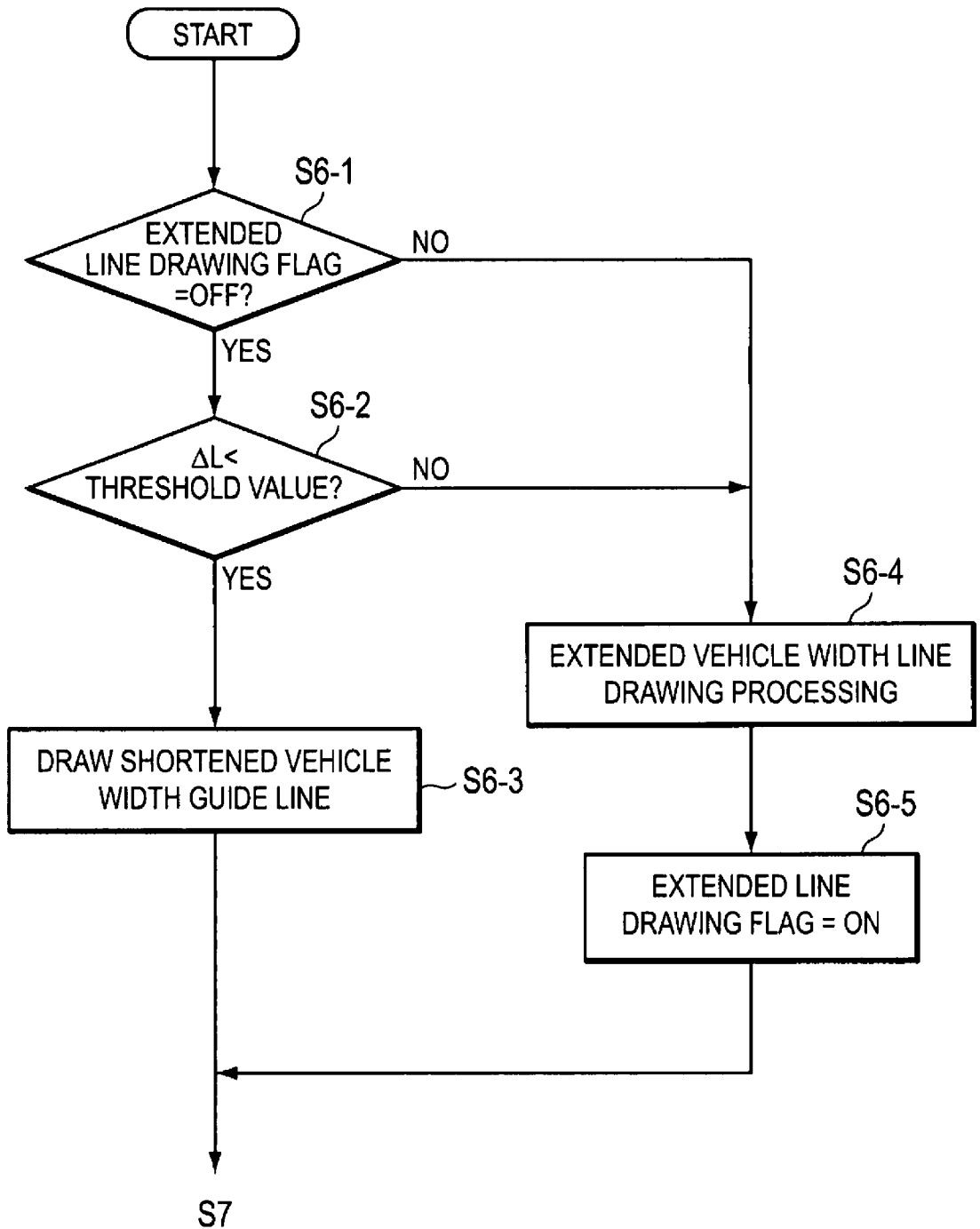
FIG. 13 is a flowchart of an exemplary method of vehicle width guide line drawing.

After the predicted arrival position drawing processing (step S5) is terminated, the image processor 15 may perform vehicle width guide line drawing processing (step S6). Such processing may be performed by the method of FIG. 13. In FIG. 13, the image processor 15 may judge whether an extended line drawing flag is OFF, which is stored in the navigation unit 5 or the image processor 15 (step S6-1). The extended line drawing flag may be a flag for indicating whether the extended vehicle width guide line W2 has been already drawn. Immediately after starting to move backward, as the cumulative reverse distance ΔL is shorter than 5 m, the extended line drawing flag may be determined to be OFF (YES in step S6-1), then the cumulative reverse distance ΔL may be judged whether or not it is shorter than a threshold value (step S6-2). The threshold value may be set at about 5 m herein.

When the cumulative reverse distance ΔL is determined to be shorter than the threshold value (YES in step S6-2), the standard vehicle width guide line W1 may be drawn on the side of the vehicle image 35 that shows the rear part (step S6-3), and then the vehicle width guide line drawing processing may be terminated. As the result, as shown in FIG. 14, the parking support screen 45 wherein the standard vehicle width guide line W1 is drawn may be displayed on the display 8. That is to say, immediately after starting to move backward, the vehicle image 35 (the vehicle C) may be far from the parking target area R sectioned by a white line. Therefore, making a turn to the parking target area R may become the focus of the parking operation. Accordingly, mainly displaying each of the predicted arrival position indicators P on the parking support screen 45 may provide a driver necessary information with an easily viewable screen. With the parking support screen 45, a driver may recognize a relative position between a fifth predicted arrival position indicator P5 and the parking target area R, for example, and determine whether or not the steering angle at the time is proper by using the standard vehicle width guide line W1 as a rough guide of the vehicle width.

When the vehicle width guide line drawing processing (step S6) is terminated, it is determined whether or not there is any termination trigger (step S7) and if no termination trigger is inputted (NO in step S7), the procedure returns to step S2.

Next, each processing in which the cumulative reverse distance ΔL of the vehicle C is equal to or greater than 1 m and shorter than 2 m will be explained. In the system start-up management processing S2, the navigation unit 5 may determine that the system start-up management flag is ON in step S2-3 (NO in step S2-3) and perform the data accumulation processing (step S3). In the data accumulation processing S3, as described above, at each time of moving backward for the image recording distance D1, the image data G may be converted to an overhead view and the generated overhead view data G1 may be written in the image memory 17. In the composite processing, the composite data G3 corresponding to the position of the vehicle at that time may be generated and the composite image 43 may be outputted on the display 8.

In the predicted arrival position drawing processing, after the counter value N is set at "1" (step S5-1), the cumulative reverse distance ΔL (equal to or greater than 1 m and shorter than 2 m) may be determined to be bigger than the initial value of the counter value N "1" (NO in step S5-2), the procedure may move on to the step S5-6, and the counter value N may be incremented to be "2." Thus, when the cumulative reverse distance ΔL is equal to or greater than 1 m and shorter than 2 m, the first predicted arrival position indicator P1 may not be drawn as shown in FIG. 7B. Then, by repeating the step S5-2 through the step S5-7, the second predicted arrival position indicator P2 to the fifth predicted arrival position indicator P5 may be drawn as shown in FIG. 7B.

When the cumulative reverse distance ΔL is equal to or greater than 1 m and shorter than 2 m, in the vehicle width guide line drawing processing, the image processor 15 may determine that the extended line drawing flag is OFF in step S6-1 (YES in step S6-1). Further, in step S6-2, the cumulative reverse distance ΔL may be judged to be shorter than the threshold value "5" (YES in step S6-2), the standard vehicle width guide line W1 may be drawn (step S6-3), and then the processing may be terminated.

In the case that the cumulative reverse distance ΔL has reached equal to or greater than 2 m and shorter than 3 m along with the backward movement of the vehicle C, when the counter value N is "1" and "2" in the step S5-2 of the predicted arrival position drawing processing (step S5), the cumulative reverse distance ΔL may be judged to be equal to or greater than the counter value N (ΔL>N) (NO in step S5-2). Further, the counter value N may be incremented (Step S5-6). When the counter value N becomes "3," the cumulative reverse distance ΔL (2≦ΔL<3) may be judged to be shorter than the counter value N (N=3) in the step S5-2 (YES in step S5-2) and the coordinate of the third predicted arrival position indicator P3 may be calculated (step S5-3, Step S5-4). Further, the third predicted arrival position indicator P3 may be drawn as shown in FIG. 7C (step S5-5). When the third predicted arrival position indicator P3 is drawn, the counter value N may be incremented to "4," and the procedure may return to step S5-2.

When the counter value N is "4" and "5," the cumulative reverse distance ΔL (2≦ΔL<3) may be shorter than the counter value N in the step S5-2, therefore, the fourth predicted arrival position indicator P4 and the fifth predicted arrival position indicator P5 may be drawn in accordance with the step S5-3 through the step S5-6. Thereby, the third predicted arrival position indicator P3 to the fifth predicted arrival position indicator P5 may be displayed on the screen as shown in FIG. 7C.

Figure 15:
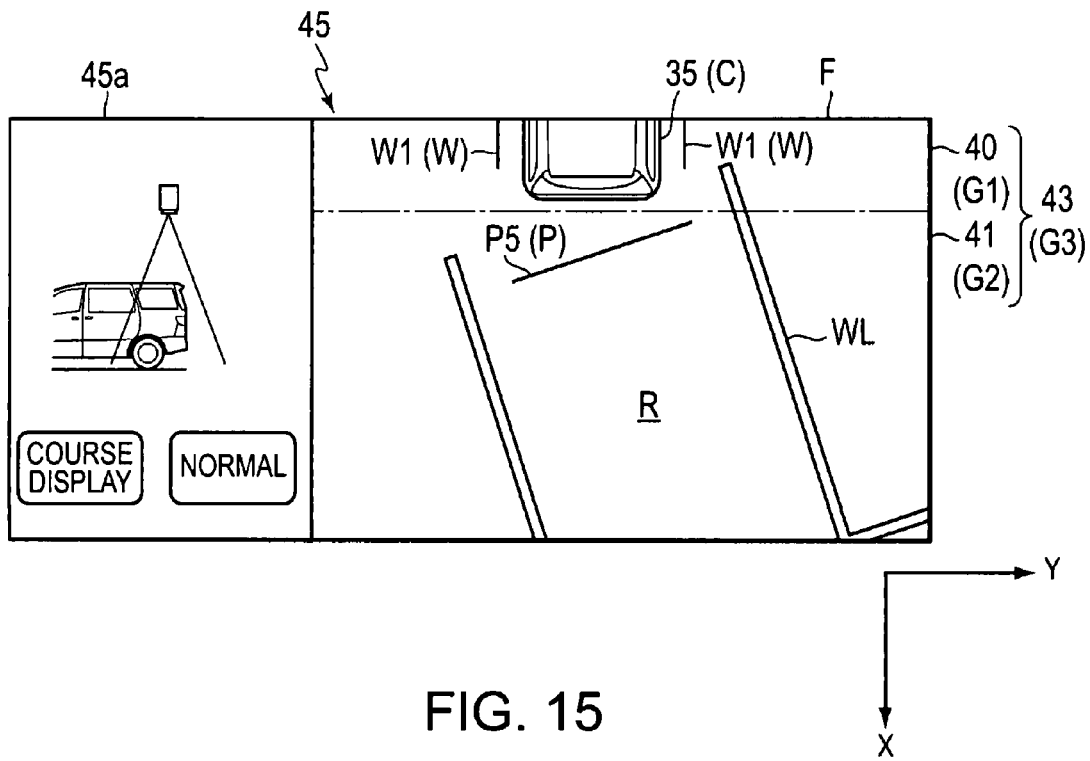
FIG. 15 is a diagram illustrating an exemplary parking support screen when a cumulative reverse distance has reached equal to or greater than 4 m and less than 5 m.

When the vehicle C further moves backward and the cumulative reverse distance ΔL has reached equal to or greater than 3 m and shorter than 4 m, the fourth predicted arrival position indicator P4 and the fifth predicted arrival position indicator P5 may be drawn only when the counter value N is incremented to "4" and "5" in the predicted arrival position drawing processing (step S5). As the result, the fourth and the fifth predicted arrival position indicator P4 and P5 may be drawn on the parking support screen 45 as shown in FIG. 7D. Then, when the cumulative reverse distance ΔL is equal to or greater than 4 m and shorter than 5 m, the fifth predicted arrival position indicator P5 may be drawn only when the counter value N is incremented to "5," and the only fifth predicted arrival position indicator P5 may be displayed on the parking support screen 45 as shown in FIG. 7E and FIG. 15.

Figure 16:
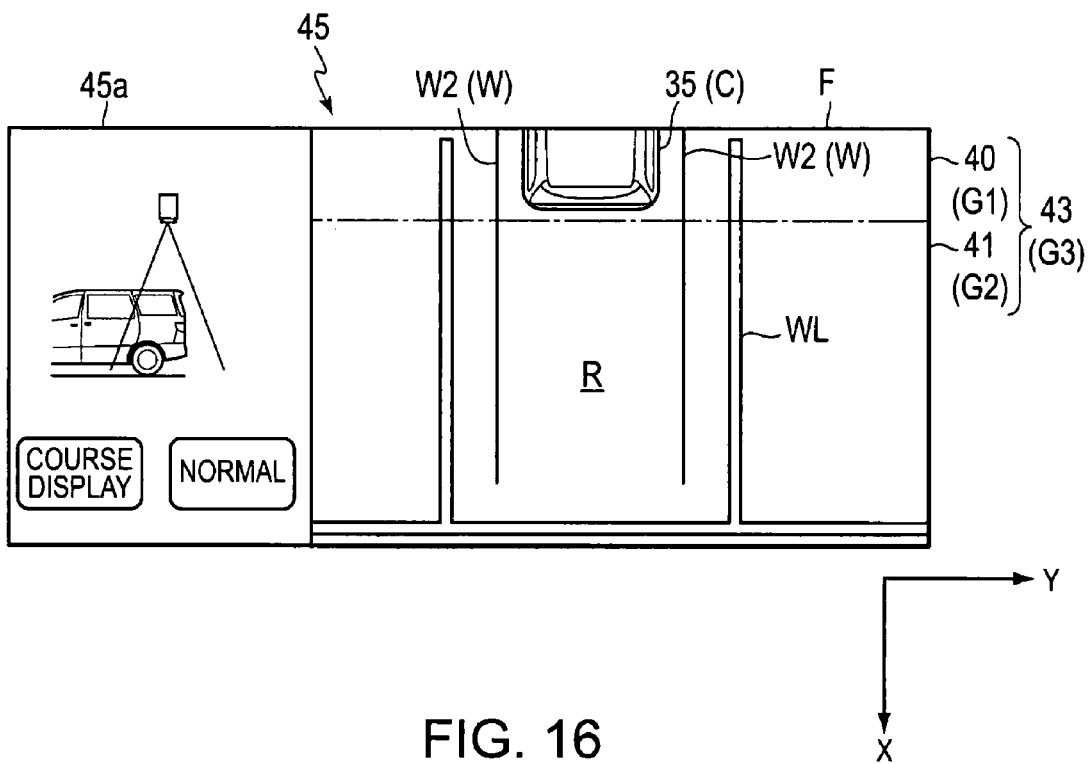
FIG. 16 is a diagram illustrating an exemplary parking support screen when a cumulative reverse distance has reached 5 m.

When the cumulative reverse distance ΔL of the vehicle C has reached 5 m, the cumulative reverse distance ΔL may be judged to be greater than the counter value N in the step S5-2 in the predicted arrival position drawing processing (NO in step S5-2), and the drawing processing for the predicted arrival position indicators P1 to P5 in step S5-3 through step S5-5 may be skipped and only the counter value N may be incremented (step S5-6). Then, when the counter value N becomes "6" in step S5-6, the counter value N may be judged to be bigger than "5" in step S5-6 (YES in step S5-6) and the predicted arrival position drawing processing may be terminated. That is to say, when the cumulative reverse distance ΔL is equal to or greater than 5 m, the predicted arrival position indicators P1 to P5 may not be drawn on the composite image 43 as shown in FIG. 16.

Subsequently, in the vehicle width guide line drawing processing, the image processor 15 may first determine that the extended line drawing flag is OFF (YES in step S6-1). Then, it may be judged that the cumulative reverse distance ΔL is greater than the threshold value (5) in step S6-2 (NO in step S6-2) and the procedure moves on to step S6-4.

In step S6-4, the image processor 15 may draw the above-described extended vehicle width guide line W2 instead of the standard vehicle width guide line W1. That is to say, as shown in FIG. 16, the extended vehicle width guide line W2 may be extended for the length of a predetermined distance (1 m to 5 m, for example) in the area corresponding to the rearward of the vehicle on the composite image 43. As the result, the extended vehicle width guide line W2 may be drawn in parallel in a vertical direction from the very top (the x direction in the figure) on the display frame F. At the time, as each of the predicted arrival position indicators P1 to P5 are not displayed, the each of the predicted arrival position indicators P1 to P5 may not be overlapped with the extended vehicle width guide line W2 accordingly.

That is, as the vehicle C is likely to approach to or enter the parking target area R at that time, it may be necessary to determine whether the vehicle C will not run off the parking target area R or whether the vehicle C is able to park at the center of the parking target area R by learning the relative distance between the white line WL sectioning the parking target area R and the extended vehicle width guide line W2 or the clearance between both right/left side of the vehicle C and the white line WL. Thus, when the cumulative reverse distance ΔL exceeds 5 m, the screen focusing on the extended vehicle width guide line W2 may be displayed in an easily viewable manner.

Subsequently, when the vehicle C completes the parking operation and the shift position turns to a position other than the reverse position (NO in step S2-2 in FIG. 9), the parking support screen 45 may be switched back to the normal back monitoring screen, for example, and it may be determined whether the system start-up flag is OFF (step S2-9). Immediately after the shift position turns to a position other than the reverse position, the system start-up flag may be ON (NO in step S2-9). Therefore the parameter may be reset (step S2-10), the system start-up flag may be turned OFF (step S2-11), and then the procedure goes on to step S7. In the state that the system start-up flag is turned OFF (YES in step S2-9), an input of a termination trigger may be waited for (step S7). When a termination trigger is inputted in step S7, the parking support may be terminated.

The above example may attain the following advantages. In the above example, the image processor 15 displays the predicted arrival position indicators P1 to P5 on the basis of the steering angle of the vehicle on the composite image 43 showing around the vehicle. When the cumulative reverse distance ΔL of the vehicle C from the reversing start position Pi is less than the threshold value (5 m), the standard vehicle width guide line W1 is drawn to the position of the rear axle with each of the predicted arrival position indicators P1 to P5. Thus, at the beginning of the parking operation when a turning movement is primary, the parking support screen 45 focusing on the predicted arrival position indicators P may be displayed providing the standard vehicle width guide line W1 capable of recognizing a rough estimate of the vehicle width.

In addition, when the cumulative reverse distance ΔL has reached equal to or more than the threshold value (5 m), each of the predicted arrival position indicators P1 to P5 is deleted and the extended vehicle width guide line W2 is extended rearward of the vehicle. Thus, the extended vehicle width guide line W2 may be displayed at the time when the driver needs to recognize the relative position between the vehicle C and the white line WL, therefore, the driver may understand the role of the extended vehicle width guide line W2 intuitively. Further, the extended vehicle width guide line W2 and each of the predicted arrival position indicators P are not overlapped, therefore, the extended vehicle width guide line W2 may be easily viewable and the screen may be easy to understand.

In the above example, the timing for displaying the extended vehicle width guide line W2 was determined based on whether or not the cumulative reverse distance ΔL of the vehicle C was equal to or greater than the predetermined distance (5 m). Thus, while the image processor 15 can reduce its processing load, the vehicle width guide line W may be extended at the time when the vehicle C has approached to the parking target area R.

The above example may be modified as below. In the above example, the image processor 15 may input the image data G at each time the vehicle C moves backward for the image recording distance D1. However, the image processor 15 may input each of the image data G by imaging on a predetermined time scale (every 30 milliseconds, for example) with the camera 20.

In the above example, the predicted arrival position indicators P1 to P5 were drawn from the reversing start position Pi to the 5-meter position with a maximum of five lines. However, it may be other than 5 m, or other than five lines. In addition, the predicted arrival position indicators P1 to P5 were drawn by one meter; however, it may be any distance other than one meter. Further, the intervals of each of the predicted arrival position indicators P may not have to be constant.

In the above example, when the cumulative reverse distance ΔL has reached equal to or greater than 5 m, the extended vehicle width guide line W2 is drawn; however, the limit may be other than 5 m. In the above example, the standard vehicle width guide line W1 is drawn from the top of the screen to the position of the rear axle; however, the standard vehicle width guide line W1 may be drawn to any position as far as the position is included in the rear part of the vehicle from the rear axle to the rear end of the vehicle.

In the above example, the reversing start position Pi where the vehicle C starts to move backward is set as an initial position to draw each of the predicted arrival position indicators P. Then, each of the predicted arrival position indicators P1 to P5 is drawn from the reversing start position Pi to a predetermined distance. Alternatively, on the basis of data of a steering angle detected by the steering sensor 33, a position of the vehicle where a steering angle was determined to be changed may be set as an initial position. In such a case, each of the predicted arrival position indicators P1 to P5 may be redrawn from the position where a driver turns a steering wheel in accordance with the parking target area R, therefore, at least the fifth predicted arrival position indicator P5 may remain on the screen until the vehicle is about to start entering the parking target area R. Further, a position of the vehicle where a driver performs a predetermined touch panel operation or the like may be set as an initial position.

Figure 17:
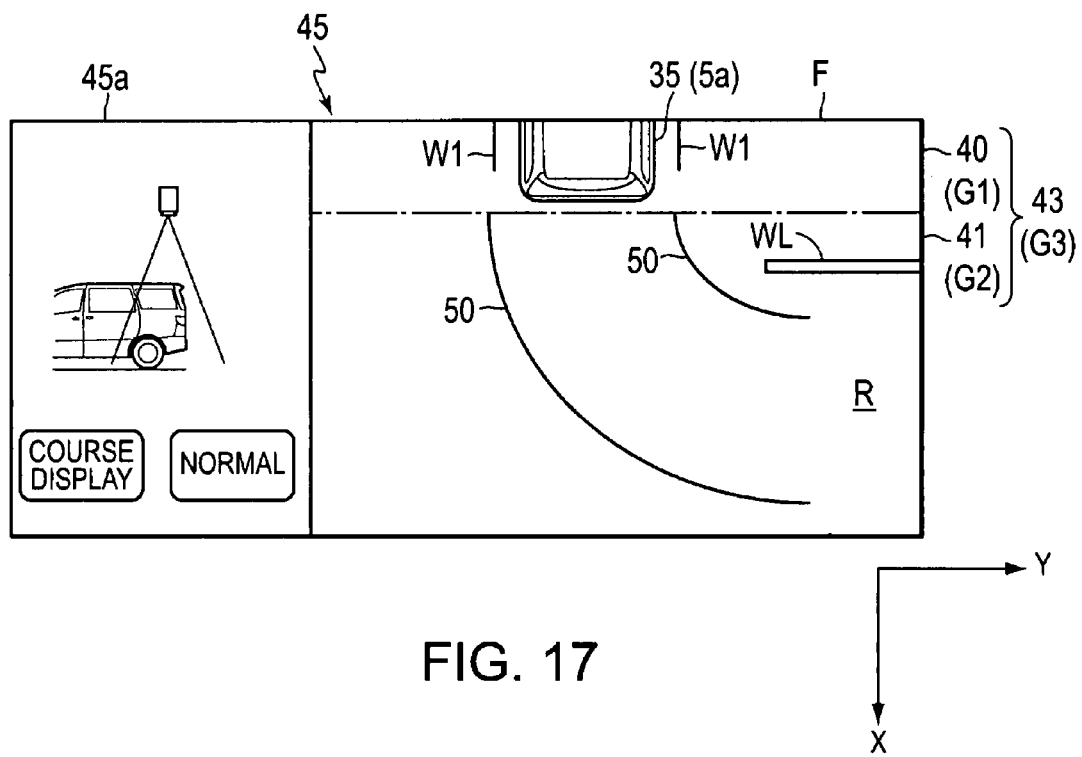
FIG. 17 is a diagram illustrating an exemplary modified parking support screen.
Figure 18:
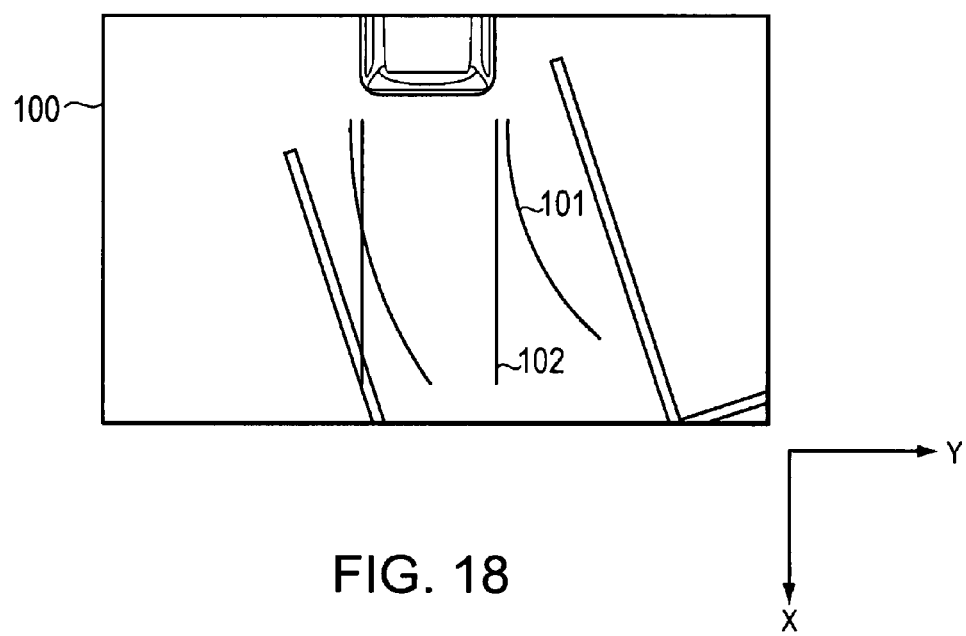
FIG. 18 is a diagram illustrating a conventional screen.

In the above example, each of the predicted arrival position indicators P1 to P5 was drawn in a direction nearly orthogonal to the reversing direction of the vehicle C as a predicted course line. However, as shown in FIG. 17, a predicted locus line 50 showing a predicted locus of, e.g., the rear wheels may be drawn. In such a case, when the cumulative reverse distance ΔL is less than a threshold value (5 m), for example, the predicted locus line 50 and the standard vehicle width guide line W1 may be drawn as shown in FIG. 17, and when the cumulative reverse distance ΔL is equal to or greater than a threshold value (5 m), the predicted locus line 50 may be deleted and the extended vehicle width guide line W2 may be drawn as shown in FIG. 16.

In the above example, when the cumulative reverse distance ΔL of the vehicle C has reached 5 m, the last fifth predicted arrival position indicator P5 was deleted and the extended vehicle width guide line W2 was drawn. Alternatively, the image processor 15 may draw a predicted course line, which moves in a traveling direction along with the backward movement of the vehicle C, and when the cumulative reverse distance ΔL of the vehicle C has reached 5 m, the predicted course line may be deleted.

In the above example, each width of the standard vehicle width guide line W1, the extended vehicle width guide line W2, the predicted locus line RV, and the predicted arrival position indicators P is a vehicle width plus a predetermined clearance width in length; however, each may be equivalent to a vehicle width. Alternatively, the image processor 15 and so forth may detect the width of the parking target area by performing a recognition processing of the white line that sections the parking target area, and the standard vehicle width guide line W1 and the extended vehicle width guide line W2 may be the detected width of the parking target area in length.

In the above example, the controller 2 may include white line recognition processing unit or other vehicle recognition processing unit. For example, when the white line recognition processing unit recognizes a white line that sections the parking target area R, the relative distance between the vehicle C and the white line may be calculated. When the relative distance becomes less than a predetermined distance, the extended vehicle width guide line W2 may be drawn. When the other vehicle recognition processing unit detects other parked vehicles and further detects a parking target area R between the other vehicles, the relative distance between the vehicle C and the other vehicles (or the parking target area R) may be calculated. When the relative distance becomes less than a predetermined distance, the extended vehicle width guide line W2 may be drawn. With suchlike processing, the data processing load may increase; however, the extended vehicle width guide line W2 may be displayed at an accurate time.

In the above example, the camera 20 is provided at the rear end of the vehicle C. However, it may be provided at the front end of the vehicle.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A parking support apparatus for use with a vehicle, comprising:
   a controller that:
      obtains image data from an imaging device provided on the vehicle;
      outputs an image on a display on the basis of the image data;
      when the vehicle is at a reversing start position, generates on the output image:
         a predicted course line on the basis of a steering angle of the vehicle; and
         a vehicle width guide line indicating a vehicle width;
      after the vehicle starts to move backward, determines whether the vehicle is in an enter-starting state in which the vehicle is about to enter a parking target area; and
      when it is determined that the vehicle is in the enter-starting state, extends the vehicle width guide line in a rearward direction of the vehicle.

2. The parking support apparatus according to claim 1, wherein the controller:
   determines that the vehicle is in the enter-starting state when a cumulative distance from an initial position where the vehicle starts to move forward or backward is determined to be equal to or greater than a predetermined distance.

3. The parking support apparatus according to claim 1, wherein the controller:
   deletes the predicted course line when it is determined that the vehicle is in the enter-starting state.

4. The parking support apparatus according to claim 1, wherein:
   the controller calculates a course of the vehicle based on the steering angle; and
   the predicted course line comprises at least one position indicator line rendered perpendicular to the calculated course of the vehicle.

5. The parking support apparatus according to claim 4, wherein the predicted course line comprises a plurality of position indicator lines rendered at a predetermined interval starting from an initial position where the vehicle starts to move forward or backward.

6. The parking support apparatus according to claim 5, wherein the controller:
   for each of the plurality of position indicator lines, deletes the position indicator line from the display as the vehicle's position reaches the position indicator line.

7. The parking support apparatus according to claim 1, wherein the controller:
   regenerates the predicted course line each time the vehicle's steering angle changes.

8. The parking support apparatus according to claim 1, wherein the controller:
   obtains image data of a parking area;
   performs image recognition on the image data of the parking area to calculate a location of the parking area; and
   determines that the vehicle is in the enter-starting state when the vehicle's position is within a predetermined distance of the parking area.

9. The parking support apparatus according to claim 1, wherein prior to extension of the vehicle width guide line, the vehicle width guide line terminates at the vehicle's rear axle.

10. A parking support method for outputting an image on a display on the basis of image data obtained from an imaging device provided on a vehicle, the method comprising:
    obtaining the image data from the imaging device;
    outputting an image on the display on the basis of the image data;
    when the vehicle is at a reversing start position, a controller generating on the image:
       a predicted course line on the basis of a steering angle of the vehicle; and
       a vehicle width guide line indicating a vehicle width
    after the vehicle starts to move backwards, the controller determining whether the vehicle is in an enter-starting state in which the vehicle is about to enter a parking target area; and
    when it is determined that the vehicle is in the enter-starting state, the controller extending the vehicle width guide line in a rearward direction of the vehicle.

11. The parking support method according to claim 10, further comprising:

determining that the vehicle is in the enter-starting state when a cumulative distance from an initial position where the vehicle starts to move forward or backward is determined to be equal to or greater than a predetermined distance.

12. The parking support method according to claim 10, further comprising:

deleting the predicted course line when it is determined that the vehicle is in the enter-starting state.

13. The parking support method according to claim 10, further comprising:

calculating a course of the vehicle based on the steering angle;

wherein the predicted course line comprises at least one position indicator line rendered perpendicular to the calculated course of the vehicle.

14. The parking support method according to claim 13, wherein the predicted course line comprises a plurality of position indicator lines rendered at a predetermined interval starting from an initial position where the vehicle starts to move forward or backward.

15. The parking support method according to claim 14, further comprising:

for each of the plurality of position indicator lines, deleting the position indicator line from the display as the vehicle's position reaches the position indicator line.

16. The parking support method according to claim 10, further comprising:

regenerating the predicted course line each time the vehicle's steering angle changes.

17. The parking support method according to claim 10, further comprising:

obtaining image data of a parking area;

performing image recognition on the image data of the parking area to calculate a location of the parking area; and determining that the vehicle is in the enter-starting state when the vehicle's position is within a predetermined distance of the parking area.

18. The parking support method according to claim 10, wherein prior to extension of the vehicle width guide line, the vehicle width guide line terminates at the vehicle's rear axle.

19. A parking support apparatus for use with a vehicle, comprising:

means for obtaining image data from an imaging device provided on the vehicle;

means for outputting an image on a display means on the basis of the image data;

means for when the vehicle is at a reversing start position, generating on the image:

a predicted course line on the basis of a steering angle of the vehicle; and a vehicle width guide line indicating a vehicle width on the image;

means for, after the vehicle starts to move backwards, determining whether the vehicle is in an enter-starting state in which the vehicle is about to enter a parking target area; and means for extending the vehicle width guide line in a rearward direction of the vehicle when it is determined that the vehicle is in the enter-starting state.

20. A parking support apparatus for use with a vehicle, comprising:

a controller that:

obtains image data from an imaging device provided on the vehicle;

outputs an image on a display on the basis of the image data ;

generates a predicted course line on the basis of a steering angle of the vehicle on the image;

generates a vehicle width guide line indicating a vehicle width on the image;

determines whether the vehicle is in an enter-starting state in which the vehicle is about to enter a parking target area;

when it is determined that the vehicle is in the enter-starting state, extends the vehicle width guide line in a rearward direction of the vehicle and deletes the predicted course line.

21. A parking support apparatus for use with a vehicle, comprising:

a controller that:

obtains image data from an imaging device provided on the vehicle;

outputs an image on a display on the basis of the image data;

generates a predicted course line on the basis of a steering angle of the vehicle on the image;

generates a vehicle width guide line indicating a vehicle width on the image, the vehicle width guide line terminating at the vehicle's rear axle;

determines whether the vehicle is in an enter-starting state in which the vehicle is about to enter a parking target area; and when it is determined that the vehicle is in the enter-starting state, extends the vehicle width guide line in a rearward direction of the vehicle.

22. A parking support method for outputting an image on a display on the basis of image data obtained from an imaging device provided on a vehicle, the method comprising:

obtaining the image data from the imaging device;

outputting an image on the display on the basis of the image data;

a controller generating a predicted course line on the basis of a steering angle of the vehicle on the image;

the controller generating a vehicle width guide line indicating a vehicle width on the image;

the controller determining whether the vehicle is in an enter-starting state in which the vehicle is about to enter a parking target area;

when it is determined that the vehicle is in the enter-starting state, the controller extending the vehicle width guide line in a rearward direction of the vehicle and deleting the predicted course line.

23. A parking support method for outputting an image on a display on the basis of image data obtained from an imaging device provided on a vehicle, the method comprising:

obtaining the image data from the imaging device;

outputting an image on the display on the basis of the image data;

a controller generating a predicted course line on the basis of a steering angle of the vehicle on the image;

the controller generating a vehicle width guide line indicating a vehicle width on the image, the vehicle width guide line terminating at the vehicle's rear axle;

the controller determining whether the vehicle is in an enter-starting state in which the vehicle is about to enter a parking target area; and when it is determined that the vehicle is in the enter-starting state, the controller extending the vehicle width guide line in a rearward direction of the vehicle.

* * * * *